Jan. 19, 1965 H. C. WATERMAN 3,166,752

PAGE PRINTING DEVICE UTILIZING A SCANNING ELECTRODE STRUCTURE

Filed Dec. 4, 1959 4 Sheets-Sheet 1

INVENTOR.
Herbert E. Waterman
BY Mueller & Aichele
Attys.

Jan. 19, 1965 H. C. WATERMAN 3,166,752

PAGE PRINTING DEVICE UTILIZING A SCANNING ELECTRODE STRUCTURE

Filed Dec. 4, 1959 4 Sheets-Sheet 2

INVENTOR.
Herbert C. Waterman
BY Mueller & Aichele
Attys

PAGE PRINTING DEVICE UTILIZING A SCANNING ELECTRODE STRUCTURE

Filed Dec. 4, 1959 4 Sheets-Sheet 3

INVENTOR.
Herbert E. Waterman
BY Mueller & Aichele
Att'ys.

Jan. 19, 1965 H. C. WATERMAN 3,166,752

PAGE PRINTING DEVICE UTILIZING A SCANNING ELECTRODE STRUCTURE

Filed Dec. 4, 1959 4 Sheets-Sheet 4

INVENTOR.
Herbert C. Waterman
BY Mueller & Aichele
Att'ys

United States Patent Office 3,166,752 Patented Jan. 19, 1965

3,166,752

PAGE PRINTING DEVICE UTILIZING A SCANNING ELECTRODE STRUCTURE

Herbert C. Waterman, Chicago, Ill., assignor to Motorola, Inc., Chicago, Ill., a corporation of Illinois Filed Dec. 4, 1959, Ser. No. 857,444
15 Claims. (Cl. 346—74)

This invention relates generally to message printing systems, and more particularly to a page printing system in which a scanning electrode structure prints complete characters in a single scan.

There is need for a simple and reliable message printing system which is especially adapted for use in radio communication systems such as are employed in mobile and aircraft communications networks. Such a system must print at relatively high speeds in order to be practical for radio communications applications. Known mechanical printers that are capable of high speed printing are more complex than is desired for such applications, and in general they are too expensive. Electrical printers offer some advantages for such applications, but known systems are not entirely satisfactory.

There is one general type of electrical printing system in which a scanning electrode forms characters on a recording sheet by electrical action. Systems of this type require several scanning cycles in order to print a complete line of a message. This imposes limitations on the printing rates which are obtainable, and also requires either that direct scanning be used in which synchronizing requires are very exacting, or that messages be coded in an indirect manner. With either of these requirements the receiving equipment's decoding circuitry has to be unduly complicated. Although it has been proposed that a printing system be provided which would print complete characters and lines of a message without requiring several scans for each line, no system of this type has been found to be commercially practical for mobile or aircraft use.

Accordingly, it is an object of the present invention to provide a message printing system with printer units of economical construction that will print at a rate significantly higher than normal spoken word rates and with a signal which may be transmitted over existing mobile and aircraft radio communications networks on a practical basis.

Another object of the invention is to provide an improved message printing unit of the scanning type that is capable of printing complete lines of a message in a single scan of a movable electrode structure.

A further object of the invention is to provide an electrical printer unit which records messages in a desired format on a recording sheet by printing patterns of dots in the form of characters, and which maintains the desired format despite variations in the length of the lines of the message.

Still another object of the invention is to provide an electrical printer unit in which the recording sheet is fed continuously past a scanning electrode structure and does not deviate to any undesirable extent from the intended direction of feed.

A feature of the invention is the provision of a message printing system having a movable electrode structure which scans across a recording sheet, with a plurality of electrode elements positioned one above the other which are capable of printing successive columns of dots. Thus, a complete line of a message can be printed in a single scan of the movable electrode structure by selectively energizing the electrode elements so that they print selected dots in successive columns and build up patterns of dots in the form of characters.

Another feature of the invention is the provision of a mobile message printing unit adapted to be mounted in a vehicle and operating by transmissions received by a radio receiver in the vehicle, which transmissions include bits of information corresponding to pulses arranged in sequence according to a binary code. The coding is compatible with the line printing arrangement discussed above so that decoding of messages is accomplished in a direct manner.

Another feature is the provision of a printer unit in which a plurality of electrode units are spaced along a belt and pulley system which moves the electrode units in succession across a recording sheet, with a latch mechanism which temporarily holds each electrode unit at the beginning of the line until the latch is energized by synchronizing signals transmitted with the message. This provides a uniform left hand margin for the printing and avoids any need for precisely synchronized motors in the printer unit.

A further feature of the invention is the provision of a printer unit having a scanning electrode structure and a continuous paper feeding mechanism with a paper aligning mechanism including rollers which release the paper momentarily, and a biasing structure which centers the paper during the time it is released, thereby preventing the paper from becoming unduly misaligned.

Certain embodiments of the invention are illustrated in the accompanying drawings in which.

Figure 1:
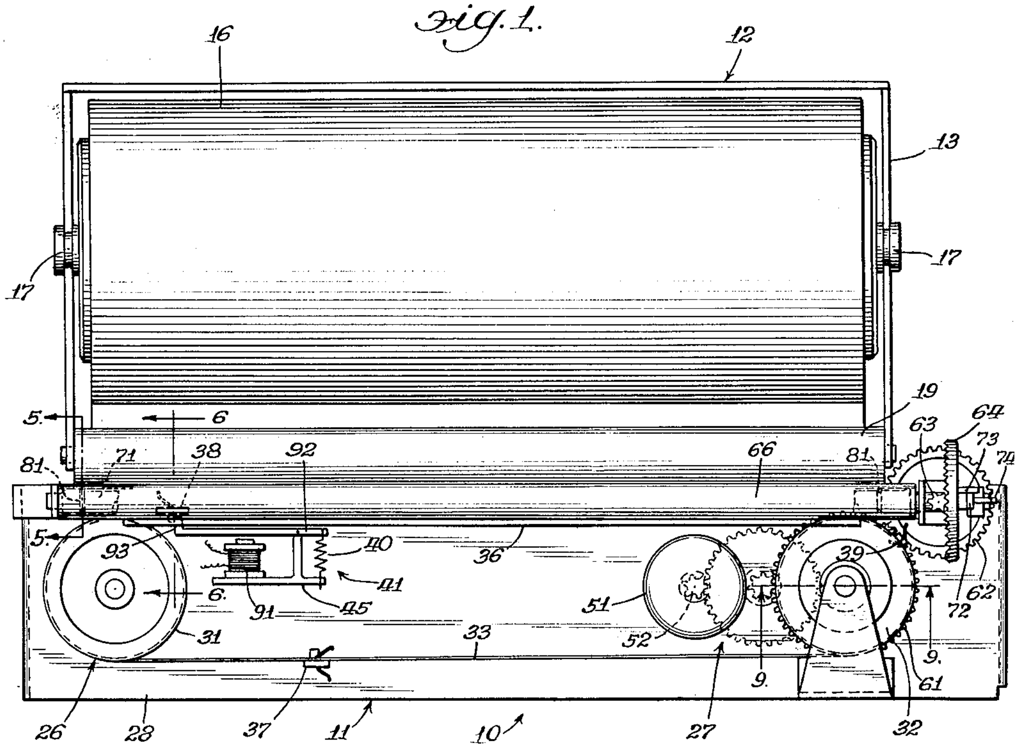
FIG. 1 is a plan view of a printer unit forming one embodiment of the invention.
Figures 3, 4, 5, 6, 6A, 8:
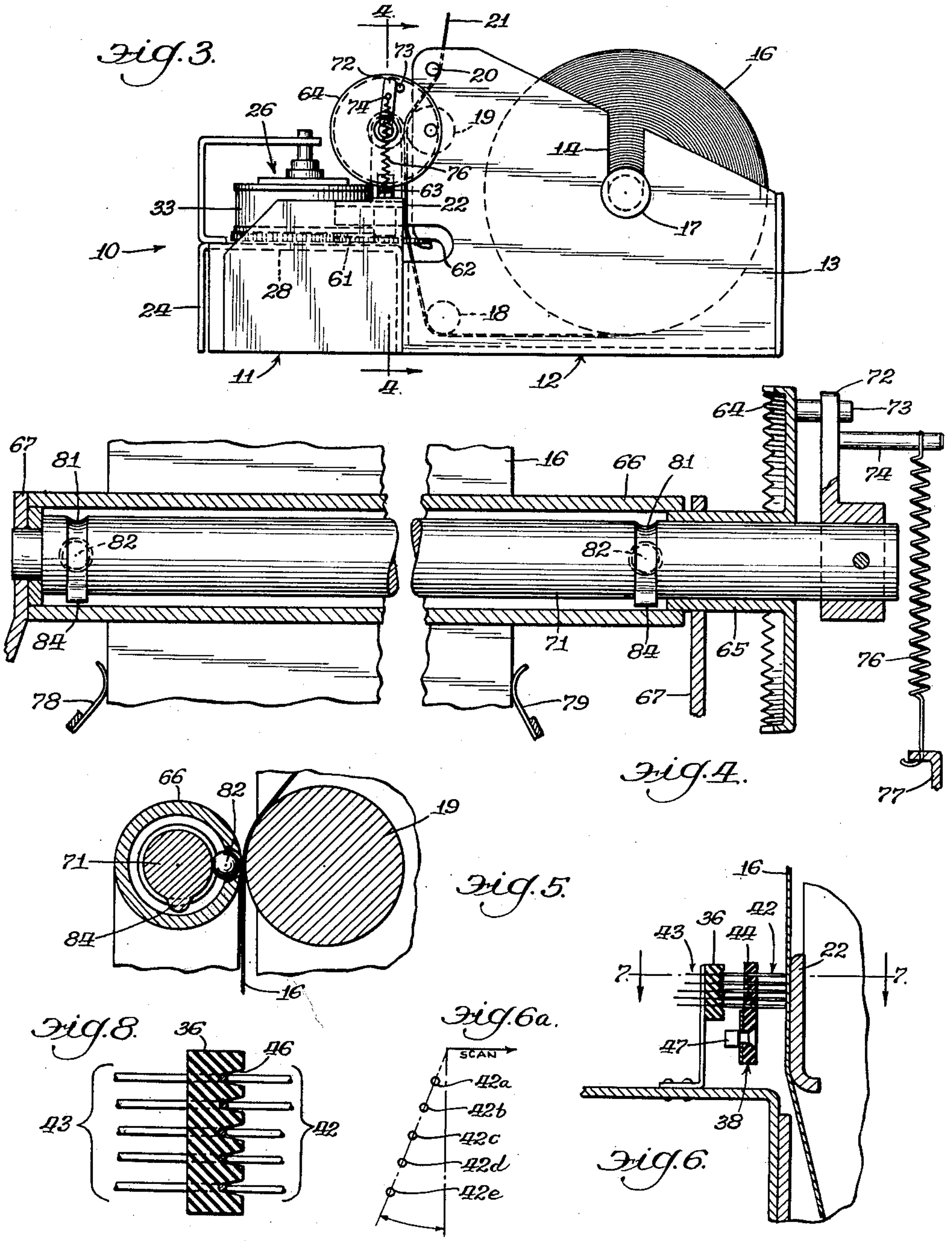
FIG. 3 is a side view of the printer unit of FIG. 1.
FIG. 4 is a sectional view taken along line 4—4 of FIG. 3 showing in particular a paper alignment mechanism which is provided in the printer unit.
FIG. 5 is a sectional view taken along line 5—5 of FIG. 1 which further illustrates the paper alignment mechanism.
FIG. 6 is a sectional view taken along line 6—6 of FIG. 1 showing in particular a multi-element scanning electrode structure that is provided in the printer unit.
Figure 7:
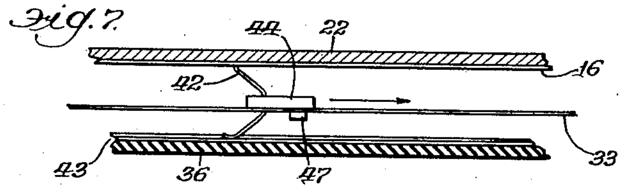
Figure 9:
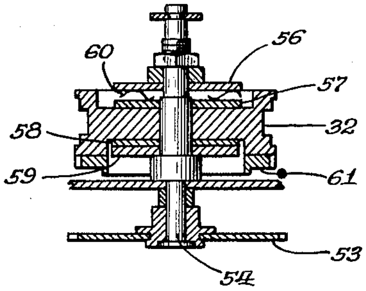
Figure 13:
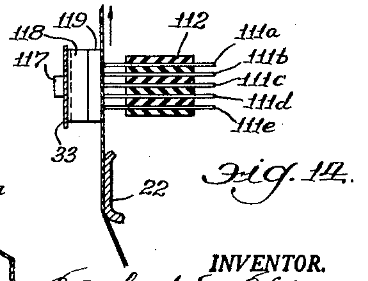
Figure 15:
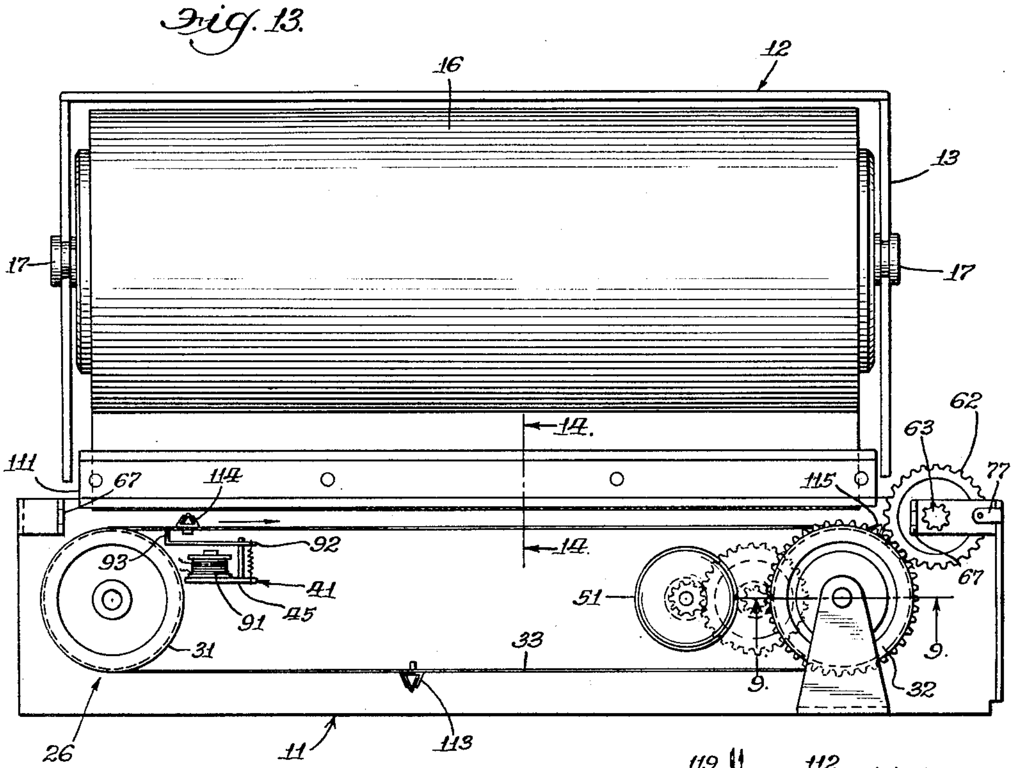
Figure 15A:
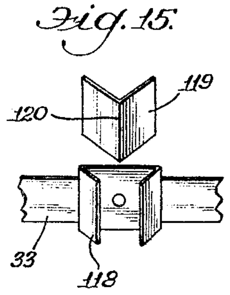
Figure 14:
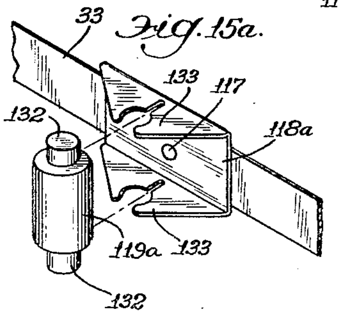
Figure 16:
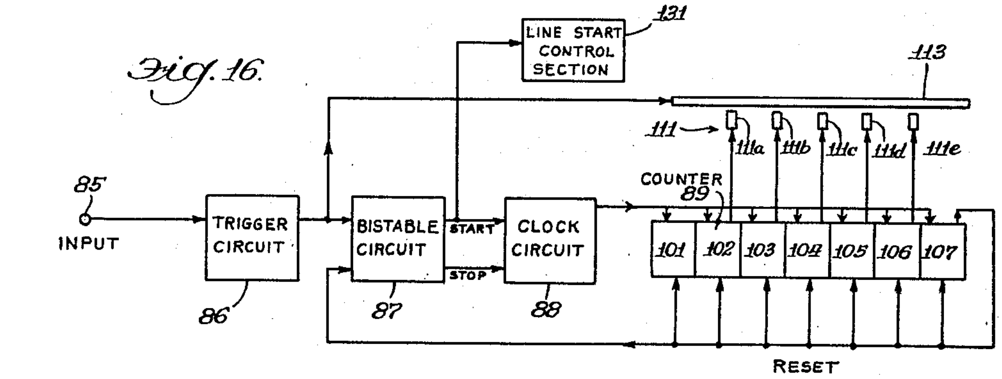
Figure 12:
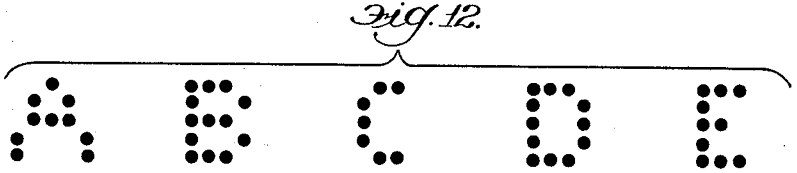
Figure 11:
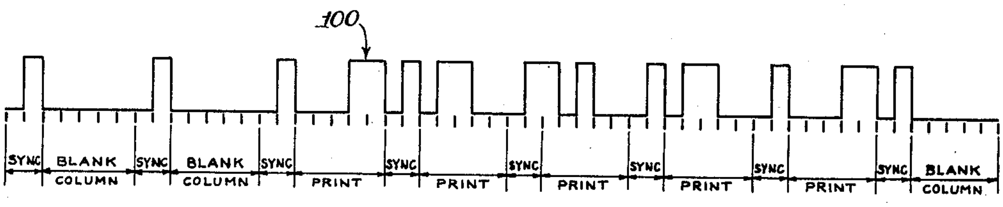
Figure 10:
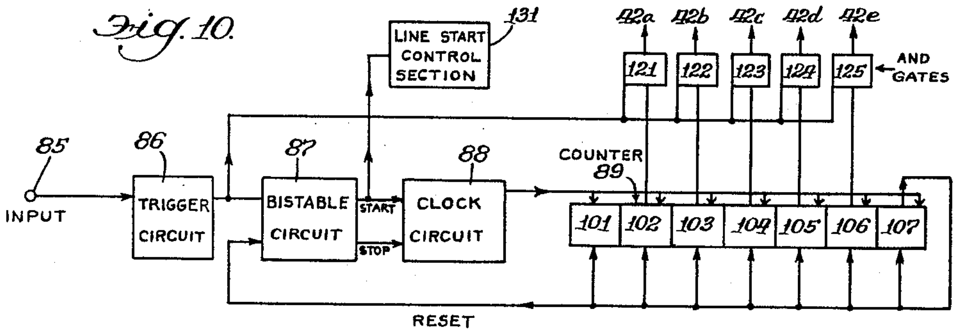

FIG. 6*a* illustrates the manner in which the ends of the electrode elements of FIG. 6 are lined up with respect to the direction of scan;

FIG. 7 is a sectional view taken along line 7—7 of FIG. 6 and further illustrates the multi-element scanning electrode structure;

FIG. 8 is an enlarged sectional view of a portion of the electrode structure shown in FIG. 6;

FIG. 9 is a sectional view taken along line 9—9 of FIG. 1 showing a pulley drive and clutch mechanism;

FIG. 10 is a block diagram of an electrical system for the printer unit of the invention;

FIG. 11 is a schematic representation of a printing signal for use with the printer unit;

FIG. 12 shows the appearance of the characters formed by the printer unit, and the characters are enlarged for purposes of illustration;

FIG. 13 is a plan view of a printer unit forming another embodiment of the invention, and certain parts of the unit are omitted in this view to show the electrode structure more clearly;

FIG. 14 is a sectional view taken along line 14—14 of FIG. 13 showing in particular a multi-element stationary electrode structure and a movable electrode;

FIG. 15 is an exploded view of the movable electrode shown in FIG. 14;

FIG. 15*a* is an exploded view of an alternate construction for the movable electrode; and FIG. 16 is a block diagram of an electrical system for the printer unit shown in FIGS. 13–15.

The message printing system of the invention includes a printer unit with a scanning electrode structure which prints complete lines of a message on a recording medium as it scans across the medium. The recording medium is provided in the form of a roll and is moved past the scanning electrode structure by a feed mechanism. The words "paper" and "sheet" are sometimes used in the specification and claims herein to denote the recording medium, and these terms are intended to cover any suitable recording medium without reference to physical structure. That is, the recording medium may or may not include actual paper fiber. It may have a plastic structure, for example. The recording medium can be either moist or dry, but dry material is preferred if it has suitable printing characteristics because it is easier to store and handle.

In the illustrated embodiments, the scanning electrode structure includes a plurality of electrode units spaced along a continuous belt which is driven by pulleys so that the movable electrode units are scanned across the sheet in sequence. In one embodiment, each scanning electrode unit has several electrode elements in the form of fingers which slide along the paper, and electrical pulses are applied to these fingers to produce marks in the form of dots on the sheet. In another embodiment, each movable electrode unit has a surface which provides linear contact with the recording sheet as it moves along one side of the sheet. A stationary electrode structure is provided with multiple electrode elements in the form of plates or blades having parallel linear surfaces which contact the other side of the sheet in lines extending along the path followed by the movable electrode units. The linear surface of each movable electrode extends transversely across all of the linear surfaces of the plates intersecting the parallel lines of contact formed thereby, and dots are printed on the sheet at the points of intersection by applying electrical pulses to the plates.

Both of the embodiments are capable of printing successive columns of dots, and characters are formed by selectively applying printing pulses to predetermined ones of the electrode elements (that is, the moving finger elements or the stationary plate elements as the case may be). From one to five successive columns of dots form a character. The printing pulses are derived from coded radio transmissions which are transmitted and received in a radio communications network.

In both of the illustrated embodiments, there are three movable electrode units mounted on a belt which is arranged so that after any one of these electrode units leaves the right side of the recording sheet, another electrode unit is positioned at the left side of the sheet ready to start the next line. A line start latch is provided to hold the newly arrived scanning electrode at the left side of the page until a synchronizing signal is applied to the latch, for purposes of printing the message line-by-line with a uniform left margin. The drive motor has a clutch which slips while the latch is holding the movable electrodes. The printer unit is also provided with an alignment mechanism which repeatedly centers the recording sheet as it moves past the scanning electrodes in order to keep it from deviating to any undesirable extent from the intended direction of movement. This is accomplished by a pair of feed rollers provided with a camming device which spreads the rollers apart once during each revolution of the rollers, thereby releasing the paper momentarily so that it can be moved to a centered position. The centering may be accomplished by providing biasing springs along the edges of the recording sheet.

Figure 2:
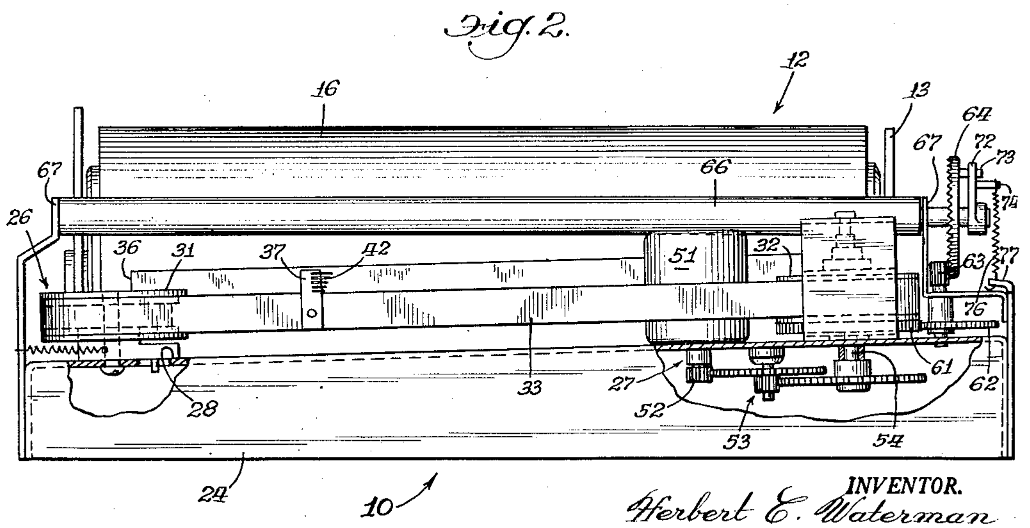
FIG. 2 is an elevational view of the printer unit of FIG. 1.

The embodiment of the invention having multi-element scanning electrodes is illustrated in FIGS. 1–10. Referring first to FIGS. 1–3, the printer unit 10 has a front section 11 and a back section 12 with the scanning mechanism being provided in the section 11 and the paper supply roll being provided in the section 12. The back section 12 includes a rectangular frame 13, and the ends of the frame are provided with vertical slots 14 which receive a shaft 17 on which the paper roll 16 is carried. Three rollers 18, 19 and 20 are rotatably mounted at the side of the frame 13 which faces the front section 11, and the paper 16 is threaded around these three rollers as illustrated in FIG. 3. The end 21 of the paper emerges from the top of section 12 and may be torn off in suitable lengths to provide pages. A metal plate 22 is mounted on the frame 13 and has a flat surface which the paper slides over and which holds the paper against the spring force of the scanning electrodes. The plate 22 also makes electrical contact with the recording sheet and thus, when paper having a conductive base is used, the plate acts as a ground electrode.

The front section 11 includes a frame 24 which supports a belt pulley system designated generally as 26, and a drive mechanism designated generally as 27. The frame 24 includes a plate 28 on which the two pulleys 31 and 32 are rotatably mounted. A steel belt 33 in the form of a loop extends around the pulley 31 and 32, and the pulleys are positioned such that the belt travels directly opposite the backing plate 22. As may be seen in FIGS. 2, 6 and 7, an insulating panel 36 is positioned directly opposite the backing plate 22, and the belt moves between the panel 36 and the plate 22.

Three electrode units 37, 38 and 39 (see FIG. 1) are spaced equidistantly along the length of the belt 33, and the belt moves these electrode units across the width of the paper 16 in sequence. Thus, when one of the scanning electrode units is leaving the right side of the paper 16, the next following electrode unit is positioned at the left side ready to print the next line of the message as shown in FIG. 1. A line start latch 41 is mounted at the left side of the frame 24 in position to hold the newly arrived electrode unit 38 (shown dotted) at the left side of the page, and the stopping and starting of the scanning mechanism by the line start latch 41 is synchronized to provide a uniform left margin for the printing.

The line start latch 41 includes a solenoid 91 which actuates an armature 92 when the line start signal is applied to the solenoid. The armature is pivotally connected to a frame 45 on which the solenoid 91 is mounted, and a spring 40 extending between the frame 41 and one end of the armature 92 biases the armature to the illustrated position. The other end of armature 92 has a projection 93 which extends into the path of the scanning electrode units. Each electrode unit has a fastener 47 connecting it to the belt 33, and this fastener projects from the electrode body 44 (see FIG. 6) and will be engaged by the tip portion 93 of the armature 92 when the electrode unit approaches the left margin of the page. When the solenoid 91 is energized, it pulls the armature 92 toward it so that the tip 93 clears the projection 47 and releases the movable electrode.

Each of the electrode units 37–39 has a plurality of printing fingers *42a, 42b, 42c, 42d* and *42e* (collectively designated 42) which are positioned one above the other as illustrated in FIGS. 6–8, and these printing fingers come into contact with the paper 16 as the electrode unit moves across the paper. Electrical signals are applied to the printing fingers 42 through conductors 43 which extend along grooves 46 provided in the face of the insulating panel 36. The printing fingers 42 extend through the electrode body 44 as illustrated in FIGS. 6–8, and they extend from the other side of the body in alignment with the conductors 43 in the grooves 46 of the panel 36. The electrode body 44 is made of insulating material as is the panel 36, so that signals supplied to individual ones of the conductors 43 are isolated. The electrode body 44 is mounted on the belt 33 by means of the rivet 47 or other suitable fastener in the manner indicated in FIG. 6.

One end of each printing finger 42 contacts the paper, and the other end of each printing finger contacts a corresponding one of the conductors 43. The fingers are resilient and therefore apply pressure to the paper to obtain proper electrical contact. Signals which are supplied to the conductors 43 are applied to the page 16 by the printing fingers 42 as they move across the paper 16. The ends of the printing fingers 42 which ride in the grooves 46 are lined up approximately at a right angle with respect to the direction of scan, but the ends which contact the paper are canted or offset slightly from this right angle relationship as illustrated in FIG. 6*a*. Thus, when printing pulses are applied to each finger successively from top to bottom in a uniformly spaced time sequence as will be described, the canted relation of the fingers compensates for the scanning velocity and a vertical column of dots is printed.

The drive mechanism 27 includes a motor 51 which rotates a pinion gear 52 seen best in FIG. 2. The rotation of the pinion gear 52 is applied by means of a gear train designated as 53 to the shaft 54. The pulley 32 is coupled to the shaft 54 by a friction clutch arrangement illustrated in FIG. 9. The clutch includes plates 56, 57, 58, 59 and the inner faces of pulley 32. Plates 56 and 59 are secured to the shaft 54. Plates 57 and 58 are washers made of phenolic or other suitable material. These plates are held together in frictional engagement by a spring 60 between plates 56 and 57. When the pulley 32 is stopped while the motor is running, washers 57 and 58 slide over the inner faces of pulley 32 permitting the shaft 54 to rotate.

A spur gear 61 is connected to the pulley 32 and drives another spur gear 62 which in turn drives a pinion gear 63 (see FIG. 2). The pinion gear 63 drives a crown gear 64 which in turn rotates a conductive driver roller 66 supported on brackets 67 attached to the frame 24. Drive roller 66 is made of electrically conducting material so that it will act as a ground electrode when paper having a conducting printing layer with a non-conducting base is used. The driver roller 66 is positioned directly opposite the roller 19 mounted on the back section 12. The paper 16 is under pressure between the rollers 66 and 19, so that rotation of the driver roller 66 moves the paper vertically over the backing plate 22 and past the scanning electrode units 37–39 in a generally vertical direction. Power for the driver roller 66 is taken from the pulley 32 rather than directly from the motor so that paper will be used only when a scanning electrode is in motion. This conserves paper and also eliminates any possibility of upward frictional force deflecting the resilient fingers in an upward direction during a latching period, with the possible consequence of causing a waviness at the start of a printed line. The plate 28, the belt pulley system 26, the drive mechanism 27, and the insulating panel 36 are disposed at a slight angle with respect to horizontal as illustrated in FIG. 2 so that the direction in which the electrodes 37–39 scan deviates slightly from a 90° relation with respect to the direction of paper feed. The purpose of this is to permit continuous movement of the paper during the scan and yet have the printed lines on the paper come out horizontal. If this arrangement were not provided, the printed lines would slope downwardly from left to right across the paper.

Referring to FIG. 4, it may be seen that the roller 66 is a tubular structure that is connected to the hub 65 of the crown gear 64. Extending through the roller 66 and the hub 65 of gear 64, there is a rotatable shaft 71, and a crank arm 72 is connected to the outer end of the shaft 71. The crown gear 64 has a pin 73 connected thereto near its periphery, and the crank arm 72 also has a pin 74 extending therefrom. A coil spring 76 is fastened at one end to the pin 74 and is fastened at the other end to a bracket 77 on the frame 24.

In operation, the pinion gear 63 drives the crown gear 64 at a relatively constant slow speed in a counter clockwise direction as viewed in FIG. 3. The crank arm 72 abuts against the pin 73 extending from the crown gear 64, and so the arm 72 rotates the shaft 71 at the same speed that the crown gear 64 rotates the roller 66. When the pin 73 reaches the upper position illustrated in FIG. 4, the spring 76 is in an overcenter relation with respect to the axis of the cam shaft 71. Therefore, the spring 76 pulls the crank arm 72 away from the pin 73, and the arm 72 moves the shaft 71 faster than the rotation of crown gear 64 until the crank arm 72 extends downwardly. The purpose of this rapid movement of the inner shaft 71 is to release the paper 16 momentarily so that it can be straightened by a pair of centering springs 78 and 79 which bear against the outer edges of the paper.

The manner in which the paper is released will be explained with reference to FIGS. 4 and 5. Near the outer ends of the shaft 71, there are two grooves 81, and fitting into each of these grooves there is a small ball 82. The balls 82 are seated in openings provided in the tubular roller 66, and the openings are small enough to hold the balls captive but at the same time are large enough so that the ball can project through the openings enough to bear against the roller 19 provided on the back section 12. It may be noted that the balls are located outside the edges of the paper, and therefore bear directly against the roller 19. Normally, there is no pressure against the balls 82, so the rollers 66 and 19 apply pressure to the paper 16. The rollers 19 and 66 are resiliently supported and can move very slightly when pressure is applied to the balls.

A pair of cam projections 84 extend from the shaft 71 in alignment with the balls 82, and these projections 84 are spaced angularly about 180° with respect to the pin 73. Thus, when pin 73 reaches the upper position illustrated in FIG. 4 and the crank arm 72 is then pulled down rapidly, the projections 84 will rotate counter clockwise as viewed in FIG. 5. As the projections 84 pass the balls 82, they will push the balls against the roller 19 and the force is sufficient to separate the rollers 19 and 66 slightly. Thus, the paper is released only momentarily while the projections 84 are in contact with the balls 82, but this momentary release is sufficient to permit the springs 78 and 79 to re-center the paper 16 if it has crept away from its centered position. It has been found that this alignment mechanism eliminates any tendency of the paper to become unduly misaligned, and prevents the paper from binding or getting torn because of such misalignment.

The printing action and the electrical system of the printer will be described with reference to FIGS. 10, 11 and 12. The printing signal is derived from a radio signal which is transmitted from a base station to radio receiver equipment provided at the field station. The radio receiver together with the printer unit may be mounted in an automobile, truck, airplane, or other vehicle. The form in which the printing information is transmitted is not critical, and may, for example, be transmitted as frequency, amplitude, or phase modulations of a carrier signal. The modulation component of the transmission may be converted by a detector or discriminator circuit into the printing signal.

The printing signal is composed of zero and one pulses which are arranged in sequence according to a binary code. A waveform 100 illustrated in FIG. 11 is derived from the printing signal, and this will serve to illustrate the various elements of the signal. The information for the characters is provided by code groups, with each group representing one column of a character. The code group for each column of the character has two pulse intervals which contain synchronizing information followed by five pulse intervals which contain the printing information. Thus, there are seven pulse intervals for each column of a character. The series of pulses which represents a line of a message includes at its beginning several code groups representing blank columns from which a line start signal is derived.

The printing signal is supplied to an input 85 (FIG. 10) for the printer unit. The input is shaped by a trigger circuit 86, and the voltage waveform 100 illustrated in FIG. 11 is the output of the trigger circuit 86. For purposes of explanation, the upper voltage level of the waveform 100 will be called the "one" level, and the lower level will be called the "zero" level. The output from the trigger circuit is fed to a bistable circuit 87. The circuits 86 and 87 are arranged so that only transitions of the trigger circuit 86 from its zero level to its one level can affect the bistable circuit 87, and such transitions cause the bistable to change from one stable state (off) to the other stable state (on). The output from the trigger circuit 86 is also gated with the outputs from the counter stages 102–106 to control the printing action as will be explained.

A series of blank code groups at the beginning of the printing signal represents the beginning of a line of the message as previously mentioned. Only two such groups are shown at the beginning of waveform 100 in FIG. 11. The first blank group at the beginning of a line causes a transition of the trigger circuit 86 of FIG. 10 from the zero level to the one level, and this changes the bistable circuit 87 to the on state. The actuation of the bistable circuit starts the clock circuit 88, and the clock circuit generates a series of pulses at the same repetition rate as the pulse intervals of the printing signal. The pulses from the clock circuit are supplied to a ring counter 89 which in the illustrated embodiment has seven counter stages numbered 101–107. The first clock pulse actuates the first counter stage 101, the second pulse actuates the second counter stage 102, and the other counter stages 103–107 are actuated in succession in the same manner. The output of the last counter stage 107 changes the bistable circuit 87 back to the off state and stops the clock circuit 88. After several repetitions of this cycle in response to succeeding blank groups, an integrating circuit in the line start control section 131 is charged to a reference level, and the control section 131 then pulses the line start latch 41 to release the electrode unit then at the left margin of the recording sheet. The electrode units then start to scan.

Enough more blank groups are transmitted to insure that the scanning electrode has reached full speed, and the code groups containing the printing information are then transmitted. As previously mentioned, each code group has seven pulse intervals which define one vertical column of the character to be printed. In the waveform of FIG. 11, the first printing group has two synchronizing pulse intervals followed by five printing pulse intervals. The first three printing pulse intervals are at the zero level and the following two printing pulse intervals are at the one level. The synchronizing transition actuates the bistable 87 to the one state and this starts the clock circuit 88. The clock generates pulses corresponding in time to the printing pulse intervals and supplies them to stages 102–106 of the counter 89. As each of these counter stages is actuated by the clock pulses an output is taken therefrom and supplied to a corresponding one of the five "and" gates 121–125.

The output of the trigger circuit 86 is supplied as a second input to all of the "and" gates 121–125. Each of the "and" gates must receive positive inputs from both the counter 89 and the trigger circuit 86 in order to be actuated. The output from the "and" gates is supplied to a corresponding one of the printing fingers 42*a*–42*e* on the scanning electrode unit that is at the time in electrical contact with the wires 43. Therefore, for the first code group, the first three "and" gates 121–123 will not be actuated, because the trigger circuit 86 is in the zero or negative state at the time the positive pulses from counter stages 102–104 are supplied to these "and" gates. The other two "and" gates 124 and 125 will be actuated because the trigger circuit 86 is in the one or positive state at the time the positive pulses from counter stages 105 and 106 are supplied to these "and" gates. Thus, in the first column of the character, the upper three printing fingers will not print dots, and the lower two printing fingers will print dots. The output from the last counter stage changes the bistable circuit 87 back to its off state and stops the clock circuit 88 at the end of the first print code group.

The next column of the character is represented by the second print code group in FIG. 11. The first transition in this group from the zero level to the one level is the synchronizing information. This transition will actuate the bistable 87 to its on state to re-start the clock which then supplies another series of pulses. The trigger output is gated with these pulses, and the fingers 42 receive signals which print the next column of the character.

Thus, it may be seen that the counter samples the printing signal to determine whether or not a dot is to be printed, and the output from the counter together with the output from the trigger circuit controls the pulses fed to the printing fingers. All code groups control the electrical system in the same basic manner as described above. As the scanning electrode unit moves across the paper 16, successive characters are printed consisting of from one to five columns of dots, and some representative characters are illustrated in FIG. 12. From this it may be seen that the printer will print complete lines of a message in a single scan of the scanning electrode.

After the end of a series of pulses representing one line of a message, the integrating circuit in the line start control section 131 discharges to a condition in which it is ready to recycle the electrical system upon receipt of the blank groups at the beginning of the next line. However, the information for the next line is not transmitted until after a time lapse sufficient to assure that all printer units in the communications system have a scanning electrode in position at the line start latch. This avoids any need for precisely synchronized motor speeds. For example, when a motor with a governor which controls its speed to within $\pm 8\%$ is used, the line interval is set at about 120 percent of the time necessary to transmit a full line of printing. This line interval is controlled entirely at the transmitting station.

The printer unit of FIGS. 1–10 can be used with any suitable electrosensitive recording medium, whether it has uniform volume resistivity (such as paper sold under the trademarks Alfax and Hogan) or non-uniform volume resistivity (such as papers sold under the trademarks Timefax and Teledeltos). The non-uniform type is made up of layers which have widely different resistivity. Some papers require that metal be deposited thereon in order to mark them. When such papers are used with the printer unit of FIGS. 1–10, the printing fingers 42 are made of the required metal and metal ions are deposited on the paper by the pulses which are applied to the fingers.

Another embodiment of the invention is illustrated in FIGS. 13–16. This embodiment is intended for use with recording mediums of the uniform volume resistivity type. The structure of this embodiment is in many respects the same as the embodiment of FIGS. 1–10, and where the structure of the two embodiments is the same, the same reference characters are applied. The feed rollers for the paper are omitted in FIG. 13 to provide a clear view of the electodes. However, it should be noted that in this embodiment the feed rollers and all other parts, with the exception of the electrodes themselves, that come in contact with the paper should be made of electrically nonconducting material. The main differences are in the structure of the electrode elements, and this is illustrated most clearly in FIGS. 14 and 15. The multi-element electrode structure in this embodiment is stationary and is behind the paper. It consists of a sandwich including a plurality of electrode plates or blades numbered 111*a*, 111*b*, 111*c*, 111*d*, and 111*e* (collectively designated 111), and these are separated by insulating material 112. The electrodes 111 project from the insulating material 112, and extend across the width of the paper 16. One edge of each electrode 111 engages the paper 16 along a line as illustrated in FIG. 14, and the lines of contact are parallel.

Three scanning electrode units 113–115 (FIG. 13) are provided, and these are spaced along the belt 33 equidistantly so that as one electrode leaves the page, another is ready to being scanning across the page as previously explained. The scanning electrode units 113, 114, and 115 include a metal body portion 118 (FIGS. 14 and 15) which is fastened to the belt by means of a rivet or other suitable fastener 117, and the fastener 117 projects from the body 118 sufficiently to engage the tip portion 93 of the armature 92 of the line start latch 41. The body 118 is bent in the form of a forked clip as illustrated. A V-shaped metal member 119 fits inside the clip 118. The V-shaped member 119 is easily detached to permit replacement. The V-shaped member 119 has an edge 120 which extends across the height of the back electrode sandwich and engages the paper opposite all of the plate electrode elements 111. The edge 120 provides a line of contact with the paper which intersects the parallel lines of contact formed by the plates 111. The line of contact formed by edge 120 deviates slightly from a right angle relationship with the direction of scan for the same reasons given in connection with the discussion of the printing fingers 42 as illustrated in FIG. 6*a*. When paper that is marked for depositing metal on it is used, the V-shaped member is made of this metal.

An alternate construction for the scanning electrode unit is shown in FIG. 15*a*, and includes cylindrical roller 119*a* rotatably supported by a bracket 118*a*. The roller provides linear contact with the front of the sheet in the same manner as described above, and since it rolls over the sheet it reduces friction. The rolller is particularly advantageous where it is made of metal that is deposited on the sheet because it has a larger surface and thus lasts longer. The roller has reduced end portions 132 which snap into openings in the bracket 118*a* so the roller is easily replaced. The bracket is slotted adjacent the openings therein so that the portions 133 around the openings are resilient and permit the roller to be snapped into place.

The electrical system of the printer unit of FIGS. 13–15 is shown in FIG. 16, and it is the same as that of FIG. 10 in many respects, and the previous description of FIGS. 10, 11 and 12 is largely applicable to FIG. 16 also. The main difference in the system of FIG. 16 is that the zero and one transitions of the trigger circuit 85 are applied to the scanning electrodes 113–115 through the belt 33 which is made of metal such as steel, and the outputs from the counter stages 102–106 are supplied to the sandwich electrode elements 111*a*, 111*b*, 111*c*, 111*d* and 111*e*. In this embodiment, a smaller, insulated backing plate 22 is located below the electrode elements and serves to assist the paper 16 in following a straight path past the electrode elements.

The printing action of this embodiment can best be visualized by thinking of the counter outputs as selectively providing low resistance return paths for any "one" pulses present on the movable electrode then in contact with the paper. Since a recording medium of uniform volume resistivity is used, current flow through the sheet is restricted mainly to the path of lowest resistance, and this will be directly from the member 119 or 119*a* to whichever of the sandwich electrodes 111*a*–111*e* is connected to a counter stage providing a low resistance path at the same time that the trigger circuit 86 is in its "one" condition. Dots are printed in columns, as previously described, at the points where the line of contact formed by members 119 or 119*a* intersects the parallel lines of contact formed by the plates 111*a*-111*e*. In the circuit of FIG. 16, no "and" gates are employed because the gating function is performed by the paper itself. The circuit arrangement of FIG. 10 may also be employed with the printer of FIGS. 13–15, and in this case the outputs of the "and" gates 121–125 are supplied to the sandwich electrode elements 111*a*–111*e* and the scanning electrodes 113–115 are at a reference potential.

It may be seen from the foregoing description that the invention provides a message printing system with compact and economical printer units which are capable of high speed printing. The manner in which complete lines are printed in a single scan of the movable electrode elements is a distinct advantage since it permits the use of direct coding of the printing signal, and this simplifies the decoding circuitry. Mechanical difficulties such as binding or tearing of the recording medium due to misalignment are prevented by the paper straightening mechanism, and this is an important advantage. There is no requirement for precisely synchronized motors for the printers, because the line interval may be set to accommodate the slowest expected motor speed of any printer in the system. Furthermore, the system is especially adapted for use with mobile and aircraft radio communication networks.

I claim:

1. Apparatus for recording information on a recording sheet, said apparatus including in combination, means for causing the recording sheet to move in a predetermined direction, at least one movable electrode structure, scanning means attached to said movable electrode structure and adapted to scan said movable electrode structure repeatedly across the recording sheet in a direction transverse to the direction of movement of the recording sheet, said electrode structure including a plurality of conductive electrode fingers extending therefrom and aligned transversely with respect to the direction of movement of said electrode structure, said electrode fingers having spaced portions following substantially parallel linear paths as said electrode structure scans across the recording sheet, means insulating said electrode fingers from one another, a plurality of stationary conductors insulated from one another and positioned to be engaged respectively by said electrode fingers as they move across the recording sheet, and circuit means for selectively applying electrical impulses to said conductors, with said impulses being coded and timed with respect to the scanning movement of said movable electrode structure to produce an array of marks arranged in columns on the recording sheet such that complete symbols are formed one after the other as said movable electrode structure scans across the recording sheet.

2. Apparatus for recording information on a recording sheet, said apparatus including in combination, means for causing the recording sheet to move in a predetermined direction, at least one movable electrode structure, scanning means attached to said movable electrode structure and adapted to scan said movable electrode structure repeatedly across the recording sheet in a direction transverse to the direction of movement thereof, said electrode structure including an insulating member with a plurality of vertically spaced conductive electrodes extending therethrough, each of said electrodes having a printing portion extending angularly towards the recording sheet and terminating in a tip aligned substantially perpendicular to the major surface of the recording sheet to follow a linear path as said electrode structure scans across the recording sheet, each of said electrodes having a finger portion extending angularly away from the recording sheet and terminating to provide a linear sliding contact in a path substantially parallel to the movement of said electrode structure, a plurality of stationary electrical conductors insulated from each other and positioned to be individually engaged by the sliding contact provided by respective finger portions of said electrode as they move across the recording sheet, and circuit means for selectively applying electrical impulses to said conductors, with said impulses being coded and timed with respect to the scanning movement of said movable electrode structure to provide columns of marks on the recording sheet such that complete symbols are formed one after the other as said movable electrode structure scans across the recording sheet.

3. Apparatus for recording information on a recording sheet, said apparatus including in combination, means for causing the recording sheet to move in a predetermined direction, at least one movable electrode structure, scanning means attached to said movable electrode structure and adapted to scan said movable electrode structure repeatedly across the recording sheet in a direction transverse to the direction of movement thereof, said electrode structure including a plurality of conductive electrode fingers extending therefrom and aligned transversely with respect to the direction of movement of said electrode structure, said electrode fingers having spaced portions following substantially parallel linear paths as said electrode structure scans across the recording sheet, means insulating said electrode fingers from one another, an elongated insulated member having a plurality of vertically spaced longitudinally extending grooves with conductive material positioned therein, said insulated member being positioned to provide contact between the conductive material in said grooves and said electrode fingers as they move across the recording sheet, and circuit means for selectively applying electrical impulses to the conductive material in said groove, with said impulses being coded and timed with respect to the scanning movement of said movable electrode structure to produce columns of marks on the recording sheet such that complete symbols are formed one after the other as said movable electrode structure scans across the recording sheet.

4. Apparatus for recording information on a recording sheet, said apparatus including in combination, means for causing the recording sheet to move in a predetermined direction, at least one movable electrode structure, scanning means attached to said movable electrode structure and adapted to scan said movable electrode structure repeatedly across one side of the recording sheet in a direction transverse to the direction of movement of the sheet, an elongated stationary electrode structure positioned on the opposite side of the recording sheet and extending substantially along the path followed by said movable electrode structure in scanning across said sheet, each of said electrode structures being engageable with the recording sheet, and one of said electrode structures including a plurality of conductive electrode elements insulated from each other and extending into contact with the recording sheet, said electrode elements being spaced from one another in the direction of movement of the recording sheet such that said electrode structures form parallel linear traces on the recording sheet as said movable electrode structure scans across the recording sheet, and circuit means electrically coupled to said electrode elements for selectively applying electrical impulses to said electrode elements, with said impulses being coded and timed with respect to the scanning movement of said movable electrode structure to produce an array of marks arranged in columns on the recording sheet such that complete symbols are formed one after the other as said movable electrode structure scans across the recording sheet.

5. The apparatus of claim 4 wherein said movable electrode structure includes a plurality of resilient conductive elements insulated from each other and spaced apart in the direction of movement of the recording sheet, and said stationary electrode structure has a conductive surface extending in a direction transverse to the movement of the recording sheet, with said conductive elements and said conductive surface being adapted to engage opposite sides of the recording sheet and apply electrical energy thereto during the scanning movement of said movable electrode structure.

6. The apparatus of claim 4 wherein said stationary electrode structure includes a plurality of spaced conductors having parallel linear edges engaging said recording sheet along parallel lines extending in the direction of scan, and wherein said movable electrode structure includes a first V-shaped conductive member having a linear surface at the point of the V extending transversely with respect to the direction of scan and engaging the recording sheet along a line which intersects said parallel lines, with said movable electrode structure further including a second conductive member having a forked shape complementary to the V-shape of said first conductive member for detachably supporting the same.

7. The apparatus of claim 4 wherein said stationary electrode structure includes a plurality of conductive plates having parallel linear edges spaced from one another in the direction of movement of said recording sheet, said parallel linear edges engaging said recording sheet along parallel lines extending in the direction of scan, and wherein said movable electrode structure includes a conductive cylindrical roller mounted with its axis transverse to the direction of scan, said roller being engageable with the recording sheet along a line which intersects said parallel lines of engagement of said conductive plates.

8. The apparatus of claim 4 wherein said circuit means includes a two-state circuit for supplying an output with transitions between first and second levels representing characters to be recorded in response to a binary signal, means providing sequential pulses having a repetition rate substantially the same as the intervals between successive transitions of said two-state circuit, a counter circuit receiving said pulses and including a plurality of stages actuated sequentially by said pulses, first output circuits individually connecting said electrode elements to respective ones of said counter stages, and a second output circuit coupling said electrode structures to said two-state circuit, said first and second output circuits having means associated therewith for gating said output transitions with outputs from said counter stages so that printing impulses are selectively applied to the electrode structures when the output of said two-state circuit is at said second level in coincidence with actuation of any of said counter stages.

9. The apparatus of claim 4 including electromagnetic latch means for stopping said transport means when one of said movable electrode structures is in a position corresponding to the beginning of a line, with said circuit means including a control section coupled to said latch means for releasing said latch means in response to an electrical signal representing the beginning of a line.

10. A printer unit for use with an electrosensitive recording sheet, said printer unit including in combination, a frame, feeding means supported on said frame for moving the recording sheet in a substantially vertical direction, a pair of pulleys supported on said frame, a belt looped around said pulleys and movable by said pulleys, power means for driving said pulleys and said feeding means, a movable electrode structure secured to said belt, said belt and said pulleys being positioned to scan said movable electrode structure repeatedly across one side of the recording sheet in a substantially horizontal direction, an elongated stationary electrode structure positioned on the opposite side of the recording sheet and extending substantially horizontally along the path followed by said movable electrode structure in moving across the sheet, each of said electrode structures being engageable with the recording sheet, and one of said electrode structures including a plurality of conductive electrode elements insulated from each other and extending into contact with the recording sheet, said electrode elements being spaced from one another in the direction of movement of the recording sheet and in aligned relation such that said electrode structures form parallel linear traces on the recording sheet when said movable electrode structure scans across the sheet, and circuit means electrically coupled to said electrode elements for selectively applying electrical impulses to said electrode elements, with said impulses being coded and timed with respect to the scanning movement of said movable electrode structure to produce an array of marks arranged in columns on the recording sheet such that complete symbols are formed one after the other as said movable electrode structure scans across the recording sheet.

11. Apparatus for recording information on an electrosensitive recording sheet, said apparatus including in combination, a frame, roller means supported on said frame for moving the recording sheet in a predetermined direction, said roller means including a pair of rollers positioned directly opposite each other on opposite sides of the recording sheet, at least one of said rollers being resiliently supported so that the recording sheet is pressed between said rollers, camming means carried by one of said rollers and engageable with the other of said rollers for separating said rollers intermittently as said rollers rotate to release the pressure of said rollers on said recording sheet, means for urging the recording sheet to a centered position with respect to said rollers for straightening the sheet when said rollers are separated, electrode means including a plurality of electrode units, and a plurality of conductive electrode elements insulated from each other and engageable with the recording sheet, means for scanning said electrode units successively across the recording sheet in a direction transverse to the direction of movement of the sheet, said electrode elements being adapted to form spaced parallel lines of contact with the sheet extending along the path followed by said electrode units in moving across the sheet, circuit means electrically coupled to said electrode elements for selectively applying electrical pulses to the recording sheet with said pulses being timed to produce marks on the sheet in positions to form characters, such that a complete line of characters can be formed in a single scan of any one of said electrode units, and electromagnetic latch means having a movable portion positioned to engage and stop said electrode units when one of the same is in a position corresponding to the beginning of a line of characters, said circuit means including a control section coupled to said latch means for actuating said movable portion to release said electrode units in response to electrical signals representing the beginning of a line of characters.

12. Apparatus for recording information on an electrosensitive recording sheet, said apparatus including in combination, a frame, roller means supported on said frame for moving the recording sheet in a predetermined direction, said roller means including a pair of rollers positioned directly opposite each other on opposite sides of the recording sheet, at least one of said rollers being resiliently supported so that the recording sheet is pressed between said rollers, camming means carried by one of said rollers and engageable with the other of said rollers for separating said rollers intermittently as said rollers rotate to release the pressure of said rollers on said recording sheet, means for urging the recording sheet to a centered position with respect to said rollers for straightening the sheet when said rollers are separated, a pair of pulleys supported on said frame, power means for driving said pulleys and said roller means, clutch means coupling said power means to one of said pulleys for enabling said pulleys to be stopped independently of said power means, a continuous belt looped around said pulleys and movable by said pulleys, a plurality of electrode units spaced along said belt and secured thereto, said belt and said pulleys being positioned to scan said electrode units successively across the recording sheet in a direction transverse to the direction of movement of the sheet, a plurality of conductive electrode elements associated with said electrode units, said electrode elements being insulated from each other and engageable with the recording sheet, and said electrode elements forming spaced parallel lines of contact with the sheet extending along the path followed by said electrode units in moving across the sheet, circuit means electrically coupled to said electrode elements for selectively applying electrical pulses to the recording sheet with said pulses being coded to produce marks on the sheet in the form of characters such that a complete line of characters can be formed in a single scan of any one of said electrode units, and electromagnetic latch means having a movable portion positioned to engage and stop said electrode units when one of the same is in a position corresponding to the beginning of a line of characters, said circuit means including a control section coupled to said latch means for actuating said movable portion to release said electrode units in response to electrical signals representing the beginning of a line of characters.

13. Apparatus for recording information on an electrosensitive recording sheet in accordance with a binary signal, said apparatus including in combination, a frame, means including roller means supported on said frame for moving the recording sheet in a predetermined direction, electrode means including a plurality of electrode units, and a plurality of conductive electrode elements insulated from each other and engageable with the recording sheet, means for scanning said electrode units successively across the recording sheet in a direction transverse to the direction of movement of the sheet, said electrode elements being adapted to form spaced parallel lines of contact with the sheet extending along the path followed by said electrode units in moving across the sheet, a two-state circuit for supplying an output with transitions between first and second levels representing characters to be recorded in response to the binary signal, a source of sequential pulses having a repetition rate substantially the same as the intervals between successive transitions of said two-state circuit, a counter circuit receiving said pulses and including a plurality of stages actuated sequentially by said pulses, first output circuits individually connecting said electrode elements to respective ones of said counter stages, and a second output circuit coupling said electrode means to said two-state circuit, said first and second output circuits having means associated therewith for gating said output transitions with the outputs from said counter stages so that printing pulses are selectively applied to the recording sheet by said electrode means when the output of said two-state circuit is at said second level at the time any of said counter stages is actuated.

14. Apparatus for recording information on an electrosensitive recording sheet, said apparatus including in combination, a frame, roller means supported on said frame for moving the recording sheet in a predetermined direction, a pair of pulleys supported on said frame, power means for driving said pulleys and said roller means, means coupling said power means to one of said pulleys for enabling said pulleys to be stopped independently of said power means, a continuous belt looped around said pulleys and movable by said pulleys, electrode means including a plurality of electrode units spaced along said belt and secured thereto, said belt and said pulleys being positioned to scan said electrode units successively across the recording sheet in a direction transverse to the direction of movement of the sheet, a plurality of conductive electrode elements insulated from each other and engageable with the recording sheet, said electrode elements being adapted to form spaced parallel lines of contact with the sheet extending along the path followed by said electrode units in moving across the sheet, electromagnetic latch means having a movable portion positioned to engage and stop said electrode units when one of the same is in a position corresponding to the beginning of a line of characters to be formed on the sheet, and circuit means for controlling said electrode means and said latch means, said circuit means including a two-state circuit for supplying an output with transitions between first and second voltage levels corresponding to binary information representing characters, a control circuit coupled between said two-state circuit and said latch means for actuating said movable portion to release said electrode units in response to a characteristic of the output of said two-state circuit representing the beginning of a line of characters, a source of sequential pulses having a repetition rate substantially the same as the intervals between successive transitions of said two-state circuit, a counter circuit receiving said pulses and including a plurality of stages actuated sequentially by said pulses, first output circuits individually connecting said electrode elements to respective ones of said counter stages, and a second output circuit coupling said electrode means to said two-state circuit, said first and second output circuits having means associated therewith for gating said voltage transitions with the outputs from said counter stages so that printing pulses are selectively applied to the recording sheet by said electrode means when the output of said two-state circuit is at said second level at the time any of said counter stages is actuated.

15. Apparatus for recording information on a recording sheet in accordance with a binary signal, said apparatus including in combination, a frame, means including roller means supported on said frame for moving the recording sheet in a predetermined direction, electrode means including a plurality of electrode units, and a plurality of conductive electrode elements insulated from each other, means for scanning said electrode units successively across the recording sheet in a direction transverse to the direction of movement of the sheet, said electrode elements being adapted to follow parallel linear paths in moving across the sheet, a two-state circuit for supplying an output with transitions between first and second levels rpresenting characters to be recorded in response to the binary signal, a source of sequential pulses having a repetition rate substantially the same as the intervals between successive transitions of said two-state circuit, a counter circuit receiving said pulses and including a plurality of stages actuated sequentially by said pulses, first output circuits individually connecting said electrode elements to respective ones of said counter stages, and a second output circuit coupling said electrode means to said two-state circuit, said first and second output circuits having means associated therewith for gating said output transitions with the outputs from said counter stages so that printing pulses are selectively applied to the electrode means when the output of said two-state circuit is at said second level at the time of any of said counter stages is actuated.

References Cited in the file of this patent

UNITED STATES PATENTS

| | | |
|---|---|---|
| 2,464,970 | Finch | Mar. 22, 1949 |
| 2,743,989 | Clurman et al. | May 1, 1956 |
| 2,788,969 | Binder | Apr. 16, 1957 |
| 2,893,810 | Miller et al. | July 7, 1959 |